United States Patent [19]
Ma et al.

[11] Patent Number: 5,825,451
[45] Date of Patent: Oct. 20, 1998

[54] METHODS OF MANUFACTURING MULTI-COLOR LIQUID CRYSTAL DISPLAYS USING IN SITU MIXING TECHNIQUES

[75] Inventors: Yao-Dong Ma, Richardson; Bao-Gang Wu, Amarillo, both of Tex.

[73] Assignee: Advanced Display Systems, Inc., Amarillo, Tex.

[21] Appl. No.: 954,321

[22] Filed: Oct. 17, 1997

[51] Int. Cl.⁶ .............................. G02F 1/1335; G02F 1/13
[52] U.S. Cl. .......................... 349/187; 349/179; 349/106
[58] Field of Search .................................... 349/187, 188, 349/106, 175, 179

[56] References Cited

U.S. PATENT DOCUMENTS

| | | | |
|---|---|---|---|
| 4,400,059 | 8/1983 | Nagae et al. | 349/179 |
| 4,832,461 | 5/1989 | Yamaagishi et al. | 349/175 |
| 4,902,592 | 2/1990 | Matsumura et al. | 349/187 |
| 4,968,120 | 11/1990 | Deep et al. | 349/106 |
| 5,179,459 | 1/1993 | Plesinger | 349/187 |

*Primary Examiner*—William L. Sikes
*Assistant Examiner*—Toan Ton
*Attorney, Agent, or Firm*—Hitt Chwang & Gaines, P.C.

[57] ABSTRACT

Methods of manufacturing a liquid crystal display ("LCD"); specifically, a multi-color LCD, e.g., a red-green-blue ("RGB") LCD. The methods include the steps of: (1) depositing a twist agent on a first substrate, the twist agent becoming an in situ twist agent, (2) bringing a second substrate into proximity with the first substrate to form at least one interstitial region between the second and first substrates, (3) introducing liquid crystal ("LC") having an initial pitch into the at least one interstitial region proximate the in situ twist agent and (4) stimulating the LC and the in situ twist agent to cause the LC and the in situ twist agent to mix in situ, the in situ twist agent changing the initial pitch of the LC.

12 Claims, 2 Drawing Sheets

METHODS OF MANUFACTURING MULTI-COLOR LIQUID CRYSTAL DISPLAYS USING IN SITU MIXING TECHNIQUES

TECHNICAL FIELD OF THE INVENTION

The present invention is directed, in general, to liquid crystal displays ("LCDs") and, more specifically, to methods of manufacturing multi-color LCDs wherein a liquid crystal ("LC") and one or more twist agents are mixed in situ.

BACKGROUND OF THE INVENTION

The development of improved liquid crystal ("LC") flat-panel displays is an area of very active research, driven in large part by the proliferation of and demand for portable electronic appliances, including computers and wireless telecommunications devices. Moreover, as the quality of LC displays improves, and the cost of manufacturing declines, it is projected that LC displays ("LCD"s) may eventually displace conventional display technologies, such as cathode-ray-tubes.

One aspect of LCDs, to which significant research has been directed in recent years, is the demand for such displays to provide full-color images. It is quite possible that LCDs capable of displaying full-color images, at full-motion video rates, will eventually displace conventional cathode-ray tubes in television and computer display applications. Several characteristics of conventional LCD materials and methods of manufacturing such displays, however, present barriers to an efficient method of manufacturing full-color displays and/or reduce the display quality of full-color LCDs manufactured using conventional materials and techniques.

LCDs are constructed by trapping a thin film of LC between two substrates of glass or transparent plastic. The conventional method of trapping the LC between the substrates is to first join the substrates and then introduce a LC into the interstitial region(s) formed therebetween. The substrates are usually manufactured with transparent electrodes, typically made of indium tin oxide ("ITO"), to which electrical "driving" signals are coupled. The driving signals induce an electric field which can cause a phase change or state change in the LC material; the LC exhibiting different light-reflecting characteristics according to its phase and/or state.

The practical difficulty of manufacturing full-color displays, using conventional techniques, is controlling the reflectance wavelength maxima for each individual microscopic pixel (or sub-pixel). Conventional manufacturing techniques introduce a LC and a predetermined amount of twist agent, as a homogenous solution, into the region between the display substrates, which results in a LCD capable of displaying only one color that is dependent on the relative ratio of twist agent to LC. To realize a full-color display, a color filter having, for example, red, green and blue ("RGB") regions (corresponding to individual sub-pixels) must be used. The use of a color filter, however, reduces the overall brightness, and contrast ratio, of the display.

Therefore, what is needed in the art is a LCD, and one or more methods of manufacture thereof, that is optimized for mass production and adaptable to allow multi-color LCDs to be produced without the need for a separate color filter.

SUMMARY OF THE INVENTION

To address the above-discussed deficiencies of the prior art, it is a primary object of the present invention to provide methods of producing liquid crystal displays ("LCDs") that allow an initial pitch of a LC to be changed in situ.

In the attainment of the above-described primary object, the present invention provides various methods of manufacturing a LCD; specifically, a multi-color LCD, e.g., a red-green-blue ("RGB") LCD. The methods include the steps of: (1) depositing a twist agent on a first substrate, the twist agent becoming an in situ twist agent, (2) bringing a second substrate into proximity with the first substrate to form an interstice between the second and first substrates, (3) introducing a LC having an initial pitch into the interstice and proximate the in situ twist agent and (4) stimulating the LC and the in situ twist agent to cause the LC and the in situ twist agent to mix in situ, the stimulating causing the in situ twist agent to change the initial pitch of the LC.

The present invention therefore introduces the broad concept of mixing a LC and a twist agent in situ; "in situ" defined for purposes of the present invention as "in place," meaning that the LC and the twist agent are not premixed before introduction into an interstice between the first and second substrates. Rather, the LC is mixed with the twist agent only after the twist agent has been deposited and the LC introduced into the interstice. That is the reason why the twist agent is stated as becoming an "in situ twist agent" once it is deposited.

In one embodiment of the present invention, the step of stimulating comprises the step of heating the LC and the in situ twist agent. Heating causes the in situ twist agent, which may advantageously be initially in a powder or fused powder form, to diffuse into the LC, causing the pitch of the LC to change, thereby modifying the optical properties of the LC. Those skilled in the art will understand that stimulation may be alternatively applied mechanically (e.g., by vibration), chemically (e.g., by introduction of a catalyst) or by other means. The broad scope of the present invention is not limited to a particular type of stimulus.

In one embodiment of the present invention, the step of depositing comprises the step of printing a twist agent on the first substrate. Conventional high resolution printing techniques (such as xerography, offset printing, dye sublimation or flexography) may be employed to deposit the in situ twist agent on the first substrate. Those skilled in the art will perceive still other techniques for depositing the in situ twist agent; all such techniques are within the broad scope of the present invention.

In one embodiment of the present invention, the method further comprises the step of forming a well in the second substrate prior to performing the step of bringing the second substrate into proximity with the first substrate, the LC occupying the well to form a pixel, or sub-pixel, of the LCD. The well, while not necessary to the present invention, advantageously provides a defined repository for the LC. In the embodiment to be illustrated and described, walls defining the boundary of the well are employed in lieu of spacers to separate the first and second substrates. Of course, the broad scope of the present invention is not limited to such structure.

In one embodiment of the present invention, the method further comprises the step of combining the LC and an initial twist agent to form a homogeneous solution prior to performing the step of introducing the LC into the interstice between the first and second substrates, the initial twist agent and the in situ twist agent cooperating to change the pitch of the LC. In the embodiment to be illustrated and described, the LC is initially "doped" with an initial twist agent (most specifically, sufficient twist agent to cause the LC to reflect green light); the in situ twist agent cooperating with the initial twist agent to change the pitch of the LC in predetermined regions of the LCD to a desired final pitch. The essence of this embodiment of the present invention is that the pitch of a LC may be changed in two steps: a first step, in which an initial twist agent is combined with the LC prior to introducing the LC into an interstice between the first and second substrates and a second step, performed in situ, in which an in situ twist agent changes at least some of the LC to a desired final pitch. Those skilled in the art will recognize that the present invention is not limited to a particular number or order of steps.

In one embodiment of the present invention, the method further comprises the step of forming a conductive matrix on the first and second substrates, the conductive matrix defining pixel locations of the LCD and providing a path for drive voltage to be conveyed to the pixel locations. The conductive matrix, which may be formed of a patterned layer of indium tin oxide ("ITO") or any other conventional or novel substance, allows the individual pixels, or sub-pixels, of the LCD to be selectively-driven to a plurality of light-reflective or transmissive states.

In one embodiment of the present invention, the LCD is a multi-color LCD, the step of depositing comprising the step of depositing first and second predetermined quantities of in situ twist agent in first and second regions on the first substrate, the step of stimulating comprising the step of stimulating the LC and the first and second predetermined quantities of in situ twist agent to form mixtures in the first and second regions, respectively, corresponding to first and second colors. Thus, this aspect of the present invention may be readily adapted to produce a multi-color LCD by selectively depositing varying amounts of one or more types of twist agents on different locations (regions) on the first substrate; the quantities and/or types of twist agent define the resulting colors of the LCD.

In one embodiment of the present invention, the in situ twist agent is selected from the group consisting of: (1) a left twist agent and (2) a right twist agent. Those skilled in the art are familiar with the effect of such twist agents on the pitch of a LC. In a related embodiment, the pitch is a function of a quantity of the in situ twist agent that is deposited on the first substrate. Of course, the pitch may be a function of the type of in situ twist agent deposited.

A second method, a method of manufacturing a multi-color cholesteric LCD, includes the steps of: (1) depositing at least one in situ twist agent at predetermined locations on a surface of a first substrate, the predetermined locations corresponding to pixels of the LCD, (2) forming a plurality of wells in a surface of a second substrate, the wells defining the location of the pixels of the LCD (3) bringing the surface of the first substrate into proximity with the surface of the second substrate to form an interstice between the first and second substrates, (4) introducing LC into the interstice to create pools of the LC in the wells and (5) stimulating the LC and the at least one in situ twist agent to form homogeneous mixtures of the LC and the at least one twist agent in situ, the at least one in situ twist agent changing pitches of the pools of the LC to create the multi-color cholesteric LCD. Thus, the present invention allows a single LCD to display multiple colors by providing for in situ mixing of LC and twist agent.

In one embodiment of the present invention, the step of introducing an LC having an initial pitch into an interstice between the first and second substrates comprises the step of introducing a green-doped LC into the interstice, the at least one twist agent adapted to change the green-doped LC into a selected one of a red-doped LC and a blue-doped LC. In the embodiment to be illustrated and described, green color is achieved by introducing an intermediate level of pitch to the LC by means of green-doping (by means of the initial twist agent in the first method). Left and right twist agents are then mixed with the green-doped LC in situ, to increase or decrease the pitch, thereby to yield the red-doped LC or the blue-doped LC. Of course, colors other than red, green and blue are readily achievable using the principles of the present invention.

In one embodiment of the present invention, colors of the LCD are a function of a type of the at least one in situ twist agent that is deposited on the surface of the first substrate. Additionally, the present invention contemplates that one may vary the resulting pitch of the LC by changing the quantity of twist agent.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
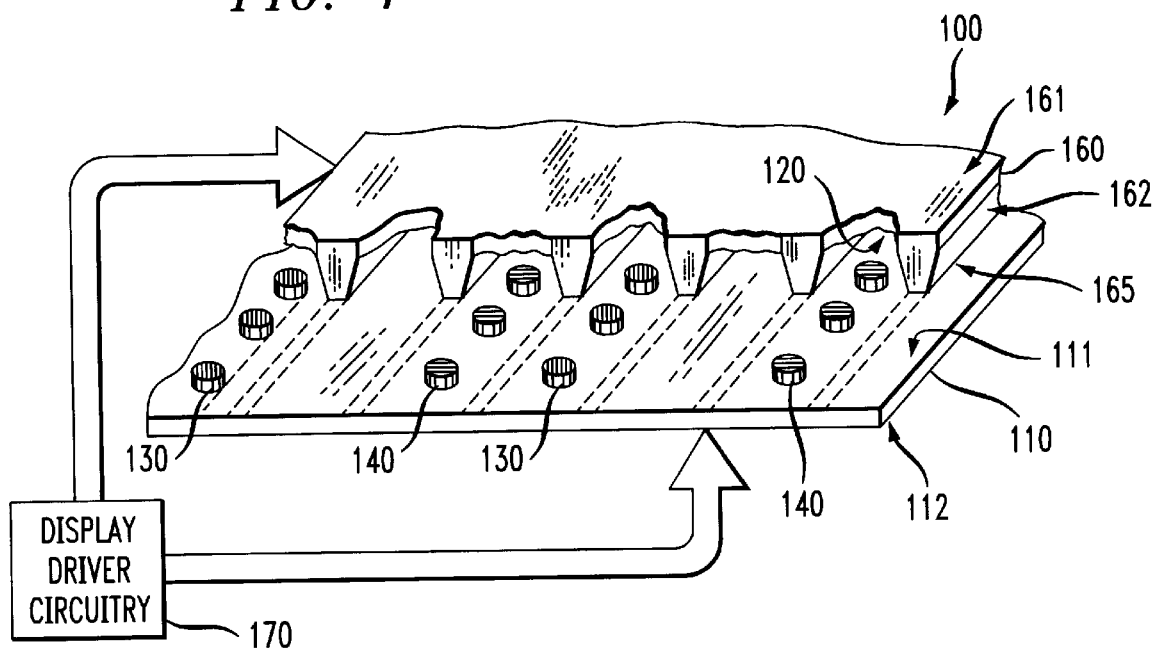
FIG. 1 illustrates a cut-away view of an exemplary liquid crystal display ("LCD") during manufacture according to the principles of the present invention.

Referring initially to FIG. 1, illustrated is a cut-away view of an exemplary liquid crystal display ("LCD") 100 during manufacture according to the principles of the present invention. The LCD includes a first substrate 110 and a second substrate 160. In the exemplary embodiment illustrated, the first substrate 110 has first and second substantially planar opposing surfaces 111, 112; the second substrate has a first surface 161 that is substantially planar and a second surface 162, opposing the first surface, that includes integral parallel "ridges," or "spacing elements," (generally designated as 165). In one embodiment, the substrates 110, 160 are substantially rigid, such as those used for conventional LCDs manufactured with glass substrates. Alternatively, one or both substrates may be flexible (i.e., plastic). As those skilled in the art will recognize, at least one of the substrates 110, 160 should be substantially transparent; e.g., for back-lit LCDs, both substrates should be substantially transparent, whereas for front-lit (i.e., reflective mode) LCDs, it is only necessary for one of the substrates to be substantially transparent. Those skilled in the art will recognize, however, that both substrates may be transparent for front-lit LCDs if, for example, an opaque coating (e.g., black) is applied to a rear surface of one of the substrates.

In one embodiment, the LCD 100 employs a cholesteric LC ("CLC;" not shown), that is introduced into the interstitial region(s) formed by the substrates 110, 160. As those skilled in the art understand, when a CLC in the "on" state is illuminated with light, the CLC reflects light that is within an intrinsic spectral bandwidth centered about a wavelength $\lambda_0$; all other wavelengths of incident light are transmitted through the CLC. The wavelength $\lambda_0$ may be within the infra-red ("invisible") or color ("visible") light spectrum, a CLC having an intrinsic wavelength in the infra-red spectrum being particularly useful in transmissive mode displays where the reflection of color to an observer is not desired or necessary. When the CLC is in the "off" state, the CLC optically scatters all wavelengths of incident light; a substantial portion of the incident light being forward-scattered and a lesser portion being back-scattered, causing a CLC to appear milky-white.

The color of a LC can be varied by adjustment of the "pitch" of the liquid crystals, as expressed by the relationship $\lambda=np$, where $\lambda$ is the wavelength of the reflected light of maximum intensity, p is the pitch and n is the average refractive index of the LC. By varying the proportion of chiral compound (i.e., "twist agent") present in the LC, this selective reflection can be achieved for any wavelength $\lambda_0$ within the infra-red and color spectrums. Thus, it is recognized that, by selectively-controlling the amount of twist agent in a LC, the display color of a LCD may appear as any color to an observer; e.g., red, green, or blue (or cyan, magenta, or yellow), the three separate primary colors conventionally used for full-color displays.

As noted previously, conventional manufacturing techniques introduce a LC and a predetermined amount of twist agent, as a homogenous solution, into the interstitial region between the display substrates, which results in a LCD capable of displaying only one color that is dependent on the relative ratio of twist agent to LC; such displays typically employing a separate color filter to achieve a full-color display. The present invention introduces the broad concept of selectively-depositing an in situ twist agent on at least one of the display substrates, prior to introducing a LC having a predetermined pitch into the interstitial region(s) between the substrates, the in situ twist agent mixing with the LC in each interstitial region to thereby change the pitch thereof According to the principles of the present invention, during the LCD manufacturing process, at least one twist agent is deposited onto one of the substrates; in the exemplary LCD 100, a first twist agent 130 is selectively-deposited onto a first region, and a second twist agent 140 is selectively-deposited onto a second region, of surface 111 of first substrate 110. The first and second regions correspond to interstitial regions (generally designated 120) formed when the first substrate 110 is brought into proximity of the second substrate 160; i.e., the regions bounded by the first surface 111 of first substrate 110 and the second surface 122 of second substrate 160, which includes integral spacing elements 165. After joining the substrates 110, 160, a LC (not shown) is introduced into the interstitial regions 120, the twist agents 130, 140 thereafter mixing (as described hereinafter) with the LC to change the pitch of the LC in the corresponding interstitial regions; the pitch of the LC introduced into a region containing no in situ twist agent retaining its initial pitch.

Those skilled in the art will recognize that the interstitial regions 120 may form sub-pixels, three adjacent regions forming a column of pixels; rows of pixels being defined, for example, by the location of transparent electrodes (not shown) positioned orthogonal to the interstitial regions 120. To provide a full-color display, the sub-pixels of each pixel should preferably appear as red, green and blue ("RGB") using an additive color system, or cyan, magenta and yellow ("CMY") using a subtractive color system (which may be employed to advantage in a transmissive mode LCD), when driven to an "on" state, in which case each pixel is capable of displaying substantially the full-range of visible colors by selectively driving each sub-pixel to a range of "on" states (i.e., various intensities).

Whereas the LC in each interstitial region 120 is isolated from the LC in adjacent regions (due to integral spacing elements 165), the resulting pitch (i.e., color) of the LC in each interstitial region 120 can be individually-controlled by the presence, or absence, of twist agent (including the amount thereof) deposited on substrate 110, as well as the amount of twist agent that may be mixed with the LC prior to its introduction into the interstitial regions. Thus, in one embodiment, the LC includes a predetermined (or "initial") amount of twist agent such that the LC would exhibit a substantially green color when driven to an "on" state. Those skilled in the art will recognize that a "green" LC typically has an "intermediate" level of twist agent; thus, by selectively-depositing relatively minor amounts of "left" or "right" twist agents on the first substrate 110, the pitch of the LC in each interstitial region 120 may be adjusted such that "red" (i.e., lower pitch than green LC) or "blue" (i.e., higher pitch than green LC) sub-pixels are produced; interstitial regions where no additional twist agent is deposited yielding sub-pixels having the initial pitch of the LC introduced into those regions (e.g., "green"). The principles of the present invention, however, are not limited to a specific initial pitch of the LC, or to the type or amount (if any) of a twist agent selectively-deposited on a substrate prior to its being joined with a companion substrate and the subsequent introduction of LC therebetween. Those skilled in the art will readily appreciate the applicability of the principles of the present invention to other combinations of sub-pixel colors, such as cyan-magenta-yellow ("CMY"), as well as less than full-color displays; the claims appended hereto intended to cover all LCDs, and the manufacture thereof, wherein an in situ twist agent is combined with a LC after its introduction into an interstitial region between the LCD substrates, the in situ twist agent modifying the initial pitch (i.e., color) of the LC.

In one embodiment, the twist agents 130, 140 are deposited on the first substrate 110 using conventional high-resolution printing techniques. For example, conventional twist agents are of a powder form, similar in granularity to conventional "toner" used in dry-process printing, which may be combined with a suitable binder such that the twist agent is held in substantial contact with the substrate when deposited thereon, but which will allow the twist agent to dissolve into solution when the LC is introduced between the substrates 110, 160. Depending on the method used to deposit the twist agent, various methods of stimulating the in situ twist agent and LC may be employed to cause the in situ twist agent to be released from the substrate and mixed into solution with the LC, including simply the application of heat.

Those skilled in the art are familiar with other high-resolution printing techniques including, without limitation, xerography, offset printing, dye sublimation, and flexography, which may be adapted to deposit a twist agent on a substrate. Furthermore, although conventional twist agents are of a powder form, the principles of the present invention may be readily adapted to use liquid or other forms of twist agents. Those skilled in the art will perceive still other forms of twist agents and techniques for deposition on a substrate; all such forms and techniques are within the broad scope of the present invention. Furthermore, although the description provided herein describes the depositing of twist agents on the first substrate 110, the principles of the present invention may, alternatively, be practiced by depositing twist agents on the second substrate 160. Moreover, twist agents may be deposited on both substrates 110, 160; e.g., twist agent 130 may be deposited on the first substrate 110 and twist agent 140 may be deposited on the second substrate 160. The principles of the present invention, and the claims recited herein, are intended to cover all LCDs, and the manufacture thereof, wherein at least one in situ twist agent is deposited on at least one of two substrates prior to the introduction of a LC into one or more interstitial region(s) formed by joining the two substrates, the in situ twist agent thereafter mixing with the LC to change the pitch thereof.

In order to provide a complete LCD, means must also be provided to control the state of each pixel, or sub-pixel. Thus, exemplary LCD 100 further includes a conductive matrix (not shown) formed on the first and second substrates 110, 160, the conductive matrix defining pixel, or sub-pixel, locations and providing a path for drive voltage to be conveyed to each pixel, or sub-pixel, location. Those skilled in the art are familiar with the use of conductive matrices for LCDs, including transparent conductive matrices formed from indium tin oxide ("ITO"). For the exemplary LCD 100, a conductive matrix suitable for providing a full-color display might include a first set of ITO electrodes (not shown), formed on the second surface 112 of first substrate 110, underlying and substantially parallel with each interstitial region 120; and a second set of ITO electrodes (not shown), formed on the first surface 161 of second substrate 160, that are substantially orthogonal to the first set of ITO electrodes, whereby a portion of each interstitial region 120 is associated with one electrode from each of the first and second sets of ITO electrodes.

By applying a voltage across the electrodes associated with a portion of each interstitial region 120, the portion can be selectively-driven to an "on" or "off" state. Those skilled in the art will recognize that each portion may form a pixel, or sub-pixel, whereby a full-color image may be displayed on the LCD 100 by selectively driving each pixel, or sub-pixel, to an "on" or an "off" state. In one embodiment, the exemplary LCD display 100 further includes driver circuitry 170, coupled to the first and second sets of electrodes, which is suitably operative to provide appropriate drive signals to each pixel, or sub-pixel. Those skilled in the art are familiar with various means and methods of providing drive signals to a LCD; the principles of the present invention are not limited to a particular means or method, but may advantageously employ conventional or novel driving means, such as that disclosed by Bao-Gang Wu et al. in U.S. application Ser. No. 08/780,315, entitled APPARATUS AND METHOD OF DRIVING A CHOLESTERIC LIQUID CRYSTAL FLAT PANEL DISPLAY, which is commonly assigned with the present invention and which is hereby incorporated by reference as if reproduced in its entirety herein.

During manufacture, a LC (not shown) is introduced into the interstitial region(s) 120. The LC may be introduced after the first and second substrates 110, 160 are joined; e.g., using a conventional vacuum-filing method as known to those skilled in the art. Alternatively, a LC may be introduced into the interstitial region(s) 120 at substantially the same time as the first and second substrates 110, 160 are joined as disclosed by Yao Dong Ma in U.S. application Ser. No. 08/841,272, entitled "CONTINUOUS-PROCESS MACHINES AND METHODS FOR MANUFACTURING LIQUID CRYSTAL DISPLAYS," which is commonly assigned with the present invention and which is incorporated herein by reference as if reproduced in its entirety. Ma discloses various machines and methods that allow LCDs to be manufactured by means of a continuous process; one of the machines includes: (1) a feeder that dispenses elongated first and second flexible substrates, (2) a LC supply that introduces a LC into an interstice between the first and second flexible substrates and (3) a substrate joiner that progressively joins the first and second flexible substrates with the LC therebetween to form a LCD. The principles of the present invention may be advantageously combined with the machines and methods disclosed by Ma, or other structures and/or methods, to manufacture multi-color LCDs using a continuous-process machine.

Figure 2:
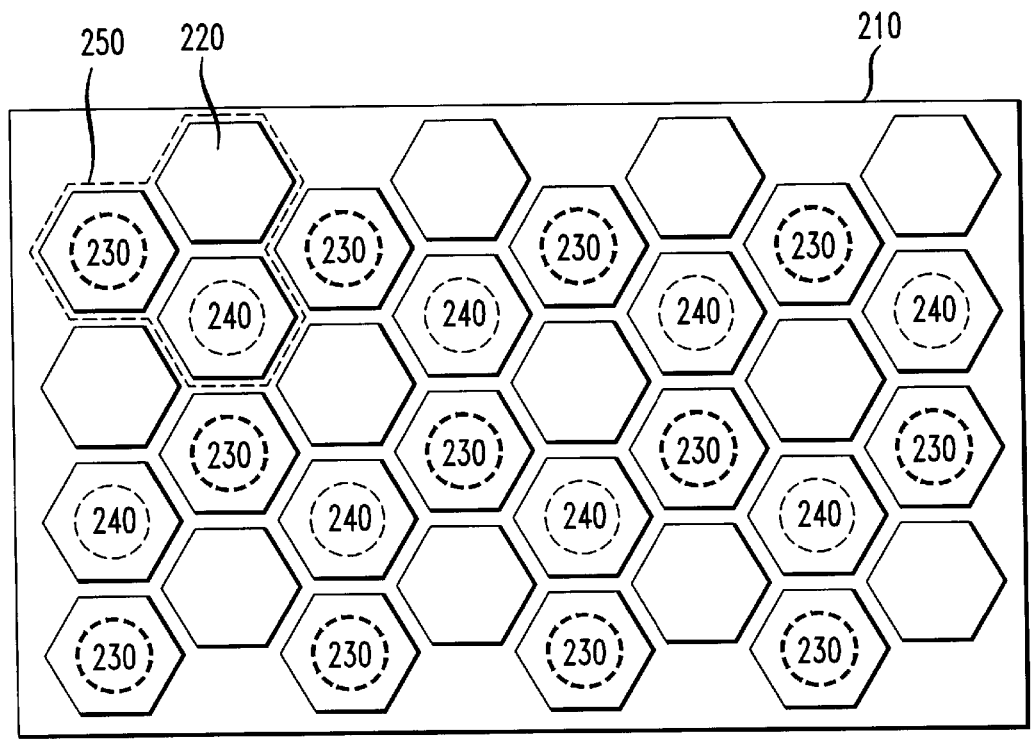
FIG. 2 illustrates an exemplary substrate that may be employed to produce a full-color LCD according to the principles of the present invention.
Figure 3:
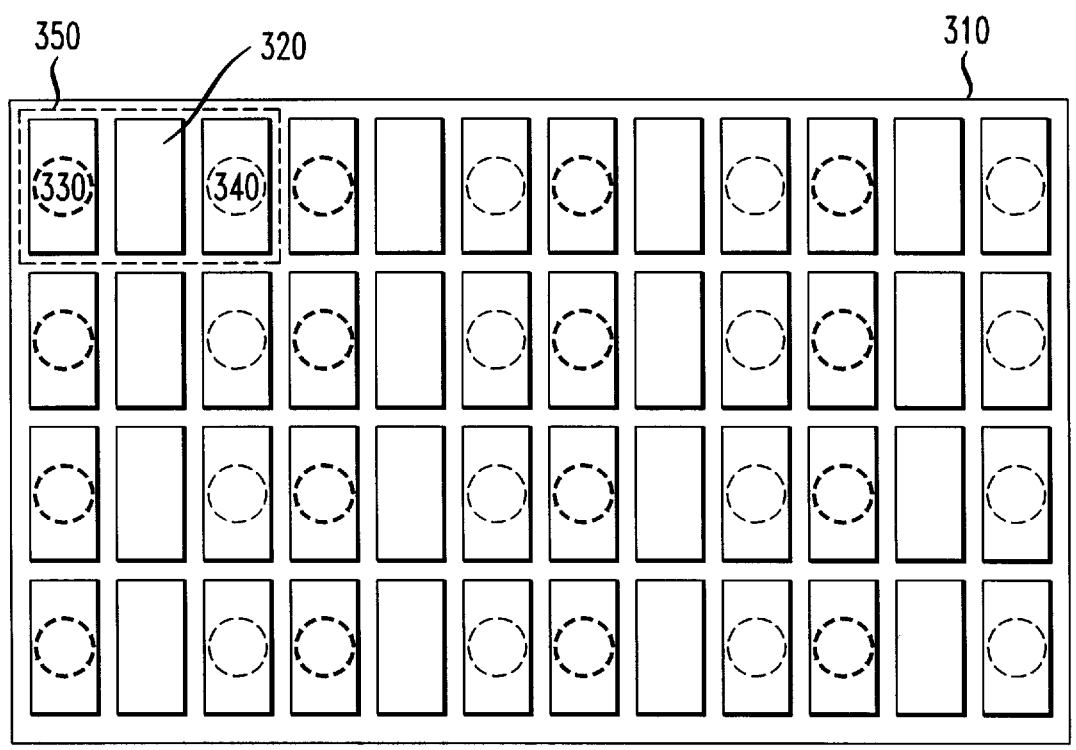
FIG. 3 illustrates an exemplary substrate that may be employed to produce a full-color LCD according to the principles of the present invention.

Although the exemplary LCD 100 illustrated in FIG. 1 employs second substrate 160 which has a first surface 161 that is substantially planar and a second surface 162, opposing the first surface, that includes integral parallel "ridges," or "spacing elements," (generally designated as 165), the principles of the present invention may be employed with other substrate structures that provide suitable means to define separate interstitial regions, such as the exemplary substrates illustrated in FIGS. 2 and 3.

Turning now to FIG. 2, illustrated is an exemplary substrate 210 that may be employed to produce a full-color LCD according to the principles of the present invention. The exemplary substrate 210 includes a "pixelated" surface defined by separate hexagonal regions, or "wells," (generally designated as 220). The exemplary substrate 210 may be manufactured using a variety of conventional techniques; for example, a thin polymeric film (e.g., a few microns thick) may be coated onto a substantially solid substrate (e.g. glass). The polymeric film may be of the photoresist type such that photolithographic exposure, followed by the removal of unexposed areas with a solvent wash, can provide a pixelated surface characterized by the presence of well-defined microscopic wells (e.g., hexagonal regions 220) on the surface. For a full-color display, the hexagonal regions 220 may be associated in groups of three to form a pixel 250, each region 220 being a "sub-pixel." As described hereinabove with respect to FIG. 1, each sub-pixel is preferably of a different pitch from the other sub-pixels with which it is associated; e.g., each pixel is formed from red, green, and blue (or cyan, magenta, yellow) sub-pixels. To provide sub-pixels of different pitches, twist agents 230, 240 are selectively-deposited on the surface of a companion substrate (such as substrate 110 illustrated in FIG. 1), such that the locations of the in situ twist agents 230, 240 will correspond to the locations of predetermined hexagonal regions 220 when the substrates are joined.

Turning now to FIG. 3, illustrated is an exemplary substrate 310 that may be employed to produce a full-color LCD according to the principles of the present invention. Similar to the exemplary substrate 210, the exemplary substrate 310 includes a "pixelated" surface defined by separate rectangular regions, or "wells," (generally designated as 320), which may also be manufactured using a variety of conventional techniques, including that described with reference to FIG. 2. For a full-color display, the rectangular regions 320 may be associated in groups of three to form a pixel 350, each region 320 being a "sub-pixel." As described hereinabove with respect to FIG. 2, to provide sub-pixels of different pitches, twist agents 330, 340 are selectively-deposited on the surface of a companion substrate (not shown), such as substrate 110 illustrated in FIG. 1, such that the locations of the in situ twist agents 330, 340 will correspond to the locations of predetermined rectangular regions 320 when the substrates are joined.

Those skilled in the art will recognize, with respect to both exemplary substrates 210 and 310, that a pixel may be defined by any predetermined number of sub-pixels (i.e., not necessarily three). Furthermore, the pixels need not be aligned, as illustrated in FIG. 3, but may be offset from one row to the next; those skilled in the art recognizing the advantages of such variations from the exemplary physical structures illustrated herein. Furthermore, because the individual regions 220 and 320 will not allow fluid communication therebetween, those skilled in the art will recognize that it may be necessary to introduce the LC into those regions prior to, or at substantially the same time as, the exemplary substrates 210 or 310 are joined to a companion substrate; e.g., by using the invention disclosed by Yao Dong Ma (U.S. application Ser. No. 08/841,272, entitled "CONTINUOUS-PROCESS MACHINES AND METHODS FOR MANUFACTURING LIQUID CRYSTAL DISPLAYS") described hereinabove. Additionally, although the in situ twist agent, in the above-described embodiments, has been described as being deposited on a first (or "companion") substrate, the twist agent may, alternatively, be deposited on the second substrate.

Although the present invention and its advantages have been described in detail, those skilled in the art should understand that they can make various changes, substitutions and alterations herein without departing from the spirit and scope of the invention in its broadest form.

What is claimed is:

1. A method of manufacturing a liquid crystal display (LCD), comprising the steps of:

depositing a twist agent on a first substrate, said twist agent thereby becoming an in situ twist agent;

bringing a second substrate into proximity with said first substrate to form an interstice between said first and second substrates;

introducing a liquid crystal (LC) having an initial pitch into said interstice and proximate said in situ twist agent; and stimulating said LC and said in situ twist agent to cause said LC and said in situ twist agent to mix after said step of introducing, said stimulating causing said in situ twist agent to change said initial pitch of said LC.

2. The method as recited in claim 1 wherein said step of stimulating comprises the step of heating said LC and said in situ twist agent.

3. The method as recited in claim 1 wherein said step of depositing comprises the step of printing said in situ twist agent on said first substrate.

4. The method as recited in claim 1 further comprising the step of forming a well in said second substrate prior to performing said step of bringing said second substrate into proximity with said first substrate, said LC occupying said well to form a sub-pixel of said LCD.

5. The method as recited in claim 1 further comprising the step of combining said LC and an initial twist agent to form a homogeneous solution prior to performing said step of introducing said liquid crystal (LC) having said initial pitch into said interstice, said initial twist agent and said in situ twist agent cooperating to change said initial pitch of said LC.

6. The method as recited in claim 1 further comprising the step of forming a conductive matrix on said first and second substrates, said conductive matrix defining pixel locations of said LCD and providing a path for drive voltage to be conveyed to said pixel locations.

7. The method as recited in claim 1 wherein said second substrate and said first substrate are flexible.

8. The method as recited in claim 1 wherein said LCD is a multi-color LCD, said step of depositing comprising the step of depositing first and second predetermined quantities of in situ twist agent in first and second regions on said first substrate, said step of stimulating comprising the step of stimulating said LC and said first and second predetermined quantities of in situ twist agent to form mixtures in said first and second regions that have first and second predetermined pitches, respectively, said first and second predetermined pitches corresponding to first and second colors.

9. The method as recited in claim 1 wherein said in situ twist agent is selected from the group consisting of:

a left twist agent, and a right twist agent.

10. The method as recited in claim 1 wherein said pitch is a function of a quantity of said in situ twist agent that is deposited on said first substrate.

11. A liquid crystal display (LCD) manufactured according to the method of manufacture recited in claim 6.

12. A LCD as recited in claim 11 further comprising:

display driver circuitry, coupled to said conductive matrix, said display driver circuitry providing a drive signal to each of said pixel locations whereby each pixel may be selectively-driven to a plurality of states.

* * * * *